(12) United States Patent  
Dillner et al.

(10) Patent No.: US 9,114,820 B1  
(45) Date of Patent: Aug. 25, 2015

(54) LOCKING CALF SUPPORT MECHANISM FOR A FOLDING TRAVEL STROLLER

(71) Applicant: ARTSANA USA, INC., Lancaster, PA (US)

(72) Inventors: James M. Dillner, Leola, PA (US); Michael L. Longenecker, Lancaster, PA (US)

(73) Assignee: ARTSANA USA, INC., Lancaster, PA (US)

( * ) Notice: Subject to any disclaimer, the term of this patent is extended or adjusted under 35 U.S.C. 154(b) by 0 days.

(21) Appl. No.: 13/948,343

(22) Filed: Jul. 23, 2013

Related U.S. Application Data (60) Provisional application No. 61/675,311, filed on Jul. 24, 2012.

(51) Int. Cl.  
*B62B 1/00* (2006.01)  
*B62B 9/12* (2006.01)

(52) U.S. Cl.  
CPC ........................................ *B62B 9/12* (2013.01)

(58) Field of Classification Search  
CPC .................................. B62B 7/06; B62B 7/00  
USPC .......... 280/648, 642, 644, 647, 643, 650, 658  
See application file for complete search history.

(56) References Cited

U.S. PATENT DOCUMENTS

| | | | |
|---|---|---|---|
| 3,556,546 A * | 1/1971 | Garner | 280/644 |
| 4,741,551 A | 5/1988 | Perego | |
| 4,917,395 A | 4/1990 | Gabriele | |
| 5,069,474 A | 12/1991 | Tai | |
| 5,755,455 A | 5/1998 | Chen et al. | |
| 5,772,235 A * | 6/1998 | Espenshade | 280/643 |
| 5,987,122 A * | 11/1999 | Daffara et al. | 379/433.13 |
| 5,988,670 A * | 11/1999 | Song et al. | 280/648 |
| 6,428,034 B1 | 8/2002 | Bost | |
| 7,686,322 B2 | 3/2010 | Longenecker et al. | |
| 8,262,124 B2 * | 9/2012 | Longenecker et al. | 280/650 |
| 8,414,012 B2 * | 4/2013 | Chen et al. | 280/648 |
| 2005/0082114 A1 * | 4/2005 | Casebolt et al. | 182/3 |
| 2008/0088116 A1 | 4/2008 | Den Boer | |
| 2010/0117315 A1 | 5/2010 | Yu et al. | |
| 2010/0164265 A1 * | 7/2010 | Tomandl | 297/326 |
| 2010/0308552 A1 | 12/2010 | Mival et al. | |
| 2011/0215552 A1 | 9/2011 | Cheng | |

* cited by examiner

*Primary Examiner* — Hau Phan  
(74) *Attorney, Agent, or Firm* — Andrew D. Mead

(57) ABSTRACT

An adjustable travel stop mechanism for a leg support on a foldable stroller frame. The leg support is moveable between opposing first and second positions wherein folding of the stroller frame moves the leg support to the second position. The user-positionable travel stop interacts with the leg support which is biased toward the first position to limit the extent to which the leg support can move toward the first position when the stroller is unfolded.

14 Claims, 10 Drawing Sheets

LOCKING CALF SUPPORT MECHANISM FOR A FOLDING TRAVEL STROLLER

CROSS-REFERENCE TO RELATED APPLICATIONS

This application claims the benefit of priority of U.S. Provisional Application 61/675,311, filed Jul. 24, 2012.

BACKGROUND OF THE INVENTION

The present application relates generally to the field of child strollers. More particularly, the present invention relates to a foldable stroller having an adjustable leg support extension that is pivotally secured to the stroller and a mechanism that retains the last adjustment support extension position when the stroller is moved between folded and unfolded conditions.

Foldable strollers are well known in the art, including many designed to be easily and conveniently operated. Foldable strollers having adjustable calf support extensions are also well known in the art. Most such calf support extensions employ a ratchet mechanism that returns to an initial position when the stroller is moved from an unfolded to a folded condition and requires adjustment by the user after the stroller is returned to the unfolded condition. In current designs, the calf support arms are forced upward by the bottom frame during folding. The support arms are able to rotate upward since the ratcheting teeth are ramped to allow rotation in one direction. However, the ratcheting teeth prevent the support arms from moving downward to a desired position after the stroller is unfolded, hence the calf support arms stay in the up position every time the stroller is opened and remain there until manually repositioned by a user.

There is a need for a foldable stroller having an adjustable calf support extension that retains the last adjustment position when the stroller is moved between a folded and unfolded condition to eliminate the extra calf support extension adjustment step following each unfolding.

SUMMARY OF THE INVENTION

Accordingly, the present invention, in any of the embodiments described herein, may provide one or more of the following advantages. It is an object of the present invention to provide a stroller having a frame that is convertible between an operating position for use and a collapsed position for storage or transport. The frame defines front and rear portions and left and right sides. The stroller includes a seat base and a seat back mounted to the frame. The stroller further includes a calf support extension forwardly disposed from the seat base and connected to the frame. The calf support extension includes at least one pivoting connector that is movable between a deployed position for use and a folded position for storage or transport. Collapsing the stroller frame pivots the calf support extension toward the folded position. Repositioning the stroller frame allows the calf support extension to pivot to the deployed position. A spring included in each pivoting connector biases the pivoting connector toward the deployed position.

It is a further object of the present invention to provide a convertible stroller having a calf support extension forwardly disposed from a seat base and including at least one pivoting connector that is movable between a deployed position for use and a folded position for storage or transport. The pivoting connector further includes an adjustable stop mechanism that allows a user to select the pivotal angular orientation of the calf support extension when in the deployed position from a plurality of pre-determined angular orientations, including one position coinciding with the folded position.

It is a still further object of the present invention to provide a conveniently adjustable calf support extension for a stroller, the stroller having a frame that is convertible between an operating position for use and a collapsed position for storage or transport, the frame defining front and rear portions and left and right sides, the stroller including a seat base and a seat back mounted to the frame wherein the calf support extension is forwardly disposed from the seat base and connected to the frame, the calf support connector further including at least one pivoting connector that is movable between a deployed position for use and a folded position for storage or transport, and an adjustable stop mechanism that allows a user to select the pivotal angular orientation of the calf support extension when in the deployed position from a plurality of pre-determined angular orientations that is durable in construction, inexpensive of manufacture, carefree of maintenance, easily assembled, and simple and effective to use.

These and other objects are achieved in accordance with the present invention by providing an adjustable travel stop mechanism for a leg support on a foldable stroller frame. The leg support is moveable between opposing first and second positions wherein folding of the stroller frame moves the leg support to the second position. The user positionable travel stop interacts with the leg support which is biased toward the first position to limit the extent to which the leg support can move toward the first position when the stroller is unfolded.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Figure 1:
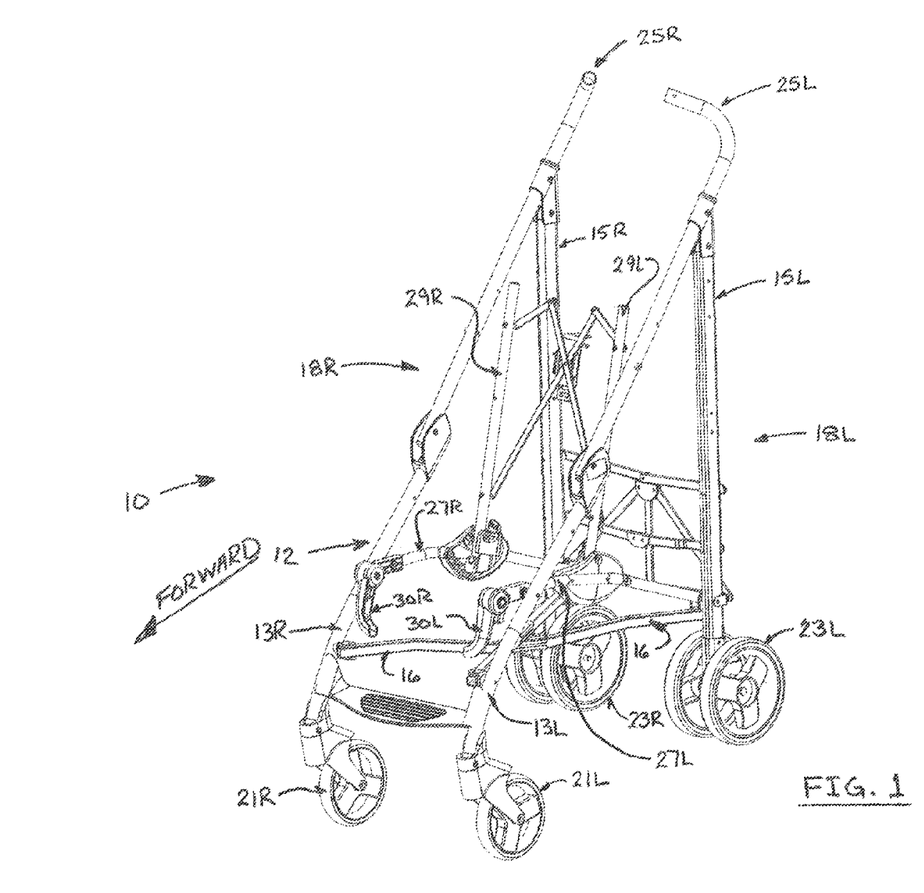
FIG. 1 is a perspective view of the frame of a conventional travel stroller of the type on which the present invention is useful.

The collapsible stroller 10 upon which the present invention finds utility is shown in FIG. 1 having a frame 12 that converts between an operating position for use (shown) and a folded or collapsed position to storage or stowing. For clarity of description, the stroller frame is shown without fabric or other material coverings which necessarily span between certain frame members to provide the support structure for a child in the stroller. Frame 12 features right 18R and left 18L side, each side comprising a forward leg 13L, 13R and a rearward leg 15L, 15R. The side frames 18L, 18R are interconnected by a lateral frame 16 that allows the sides to be brought together in the collapsed position and spaced apart at a pre-determined width in the operating position. Front wheel assemblies 21L, 21R are connected to forward legs 13L, 13R while rear wheel assemblies 23L, 23R are connected to rearward legs 15L, 15R to provide mobility of the stroller 10. Front 21L, 21R and/or rear wheel assemblies 23L, 23R may include generally vertically aligned pivotal connections to their respective frame legs to allow the stroller to be steered. One or more handlebars 25L, 25R provide a convenient interface means for a user to guide and propel the stroller 10.

Figure 2:
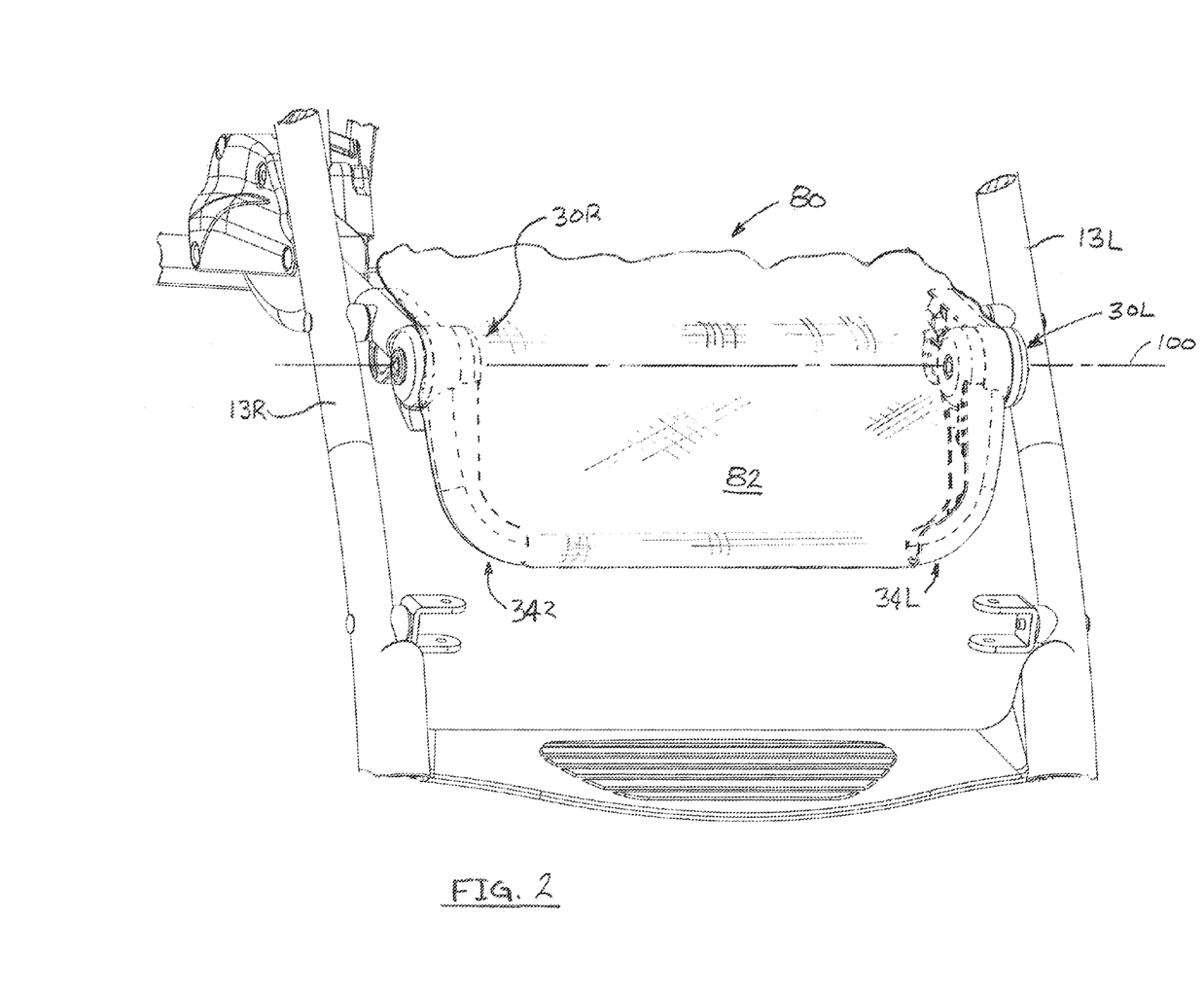
FIG. 2 is a partial perspective view of moveable calf support structure on a travel stroller incorporating one embodiment of the present invention.

Stroller frame 12 also includes seat base frame members 27L, 27R and seat back frame members 29L, 29R which support the seat base and back for the stroller. The seat base and back frame members may be user-adjustable or may be fixed with respect to the stroller frame 12 when in the operating position. The forward end of the seat base includes a movable calf support extension 80. The calf support extension 80 (see FIG. 2) is defined by and connected to the frame 12 by a pair of calf support connectors 30L, 30R which are affixed at the forward ends of seat base frame members 27L, 27R. Calf support connectors 30L, 30R are configured to allow the angular orientation of the calf support extension 80 to be adjusted with respect to the seat base. The calf support extension is defined by a fabric covering 82 spanning between calf support connectors 30L, 30R, as illustrated in FIG. 2.

Referring now to FIGS. 3 through 10, the calf support connector 30 is shown to comprise a calf support mount 32, configured to connect to the forwardmost end of seat base frame member, and a calf support arm 34 that is pivotally coupled to mount 32. The pivotal connection may include a rivet 31 or the like engaging apertures 33, 35, in the support mount 32 and support arm 34. A torsion spring 36 is positioned about a generally transverse pivotal axis 100 and configured to bias the rotational position of the calf support arm 34 in a first direction, preferably toward an extreme lower operating position (see FIG. 5) and generally opposite of its position when the stroller is in a folded configuration (see FIG. 7), shown as arrow "A" in FIGS. 5 through 7. In the exemplar embodiment, annular cavities 62, 63 provided in support mount 32 and support arm 34 house the torsion spring 36 and conceal it from normal view. Anchor receptacles 64, 65 connect the spring ends 39, 37, respectively, to the support mount 32 and support arm 34, respectively, thereby enabling the torsion spring to bias the support arm relative to the support mount.

In order to allow the calf support extension 80 to be set in a desired position to which it will return upon each deployment of the stroller, an adjustable travel limiter 50, also referred to as a lock knob, is provided. Referring to FIGS. 5 through 10, three illustrative angular orientations of the calf support extension are provided. In each figure, the direction of the spring 36 bias force is shown as well as the relationship between the travel limiter 50 (including stop tab 51), the support mount 32, and the support arm 34. While three positions are illustrated, it will become apparent from the subsequent description of the travel limiter 50 mechanism that many angular orientations may be available dependent upon the configuration of the internal arrangement of the travel limiter ratchet mechanism.

Again referring to FIGS. 3 and 4, travel limiter 50 engages support mount 32 and is rotationally coupled thereto by rivet 31 engaging aperture 52 which enables travel limiter pivotal movement about axis 100. Travel limiter 50 comprises a stop tab 51 which is generally perpendicularly aligned to axis 100 and positioned to engage an exterior surface of the support arm 34 (see FIGS. 5 thorough 7) or otherwise interact with the support arm to limit rotation once the interaction between the stop tab 51 and the arm 34 is established. The rotational position of travel limiter 50 is fixed through the interaction of ratchet lock gear 53 with travel limiter 50. Ratchet lock gear 53 is rotationally secured to support mount 32 by a plurality of radially protruding tabs 54 which engage receptacles 72 formed in the support mount 32.

Figure 3:
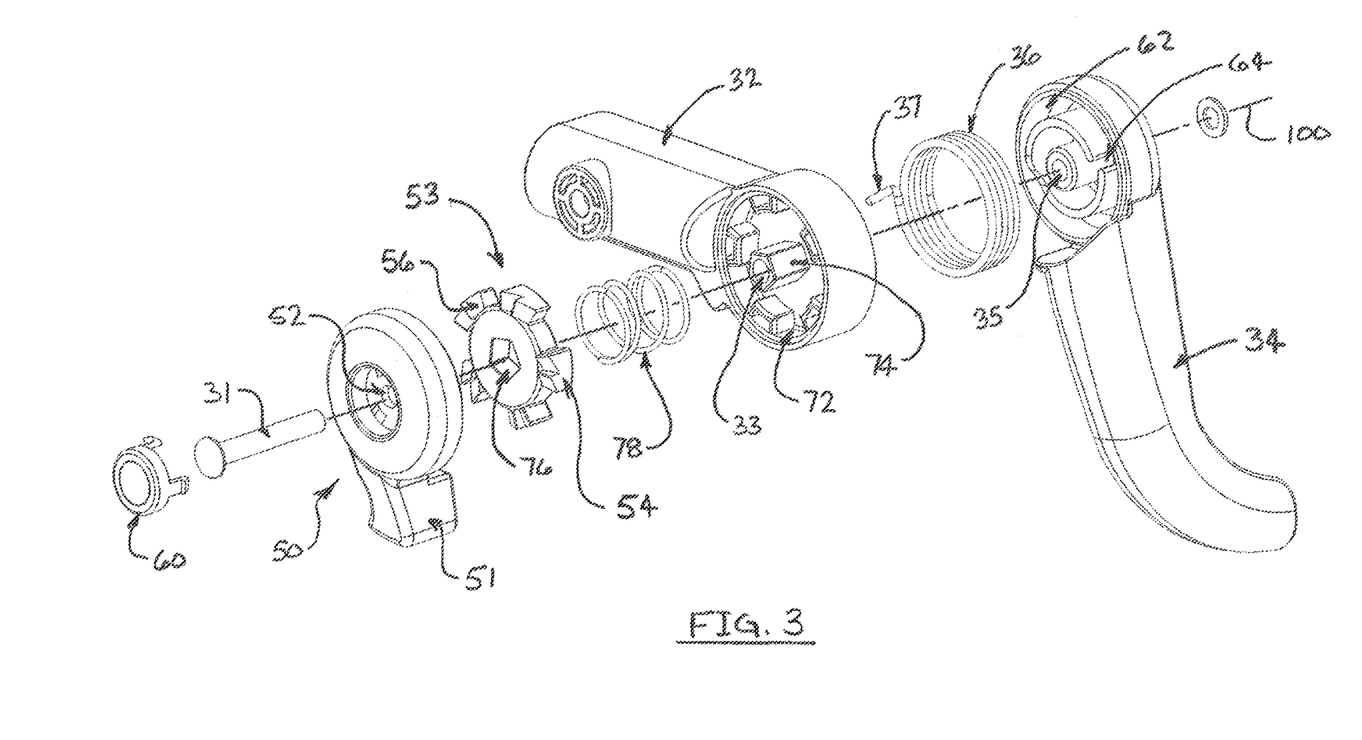
FIG. 3 is an exploded view from a first perspective of one embodiment of the calf support connector invention.
Figure 4:
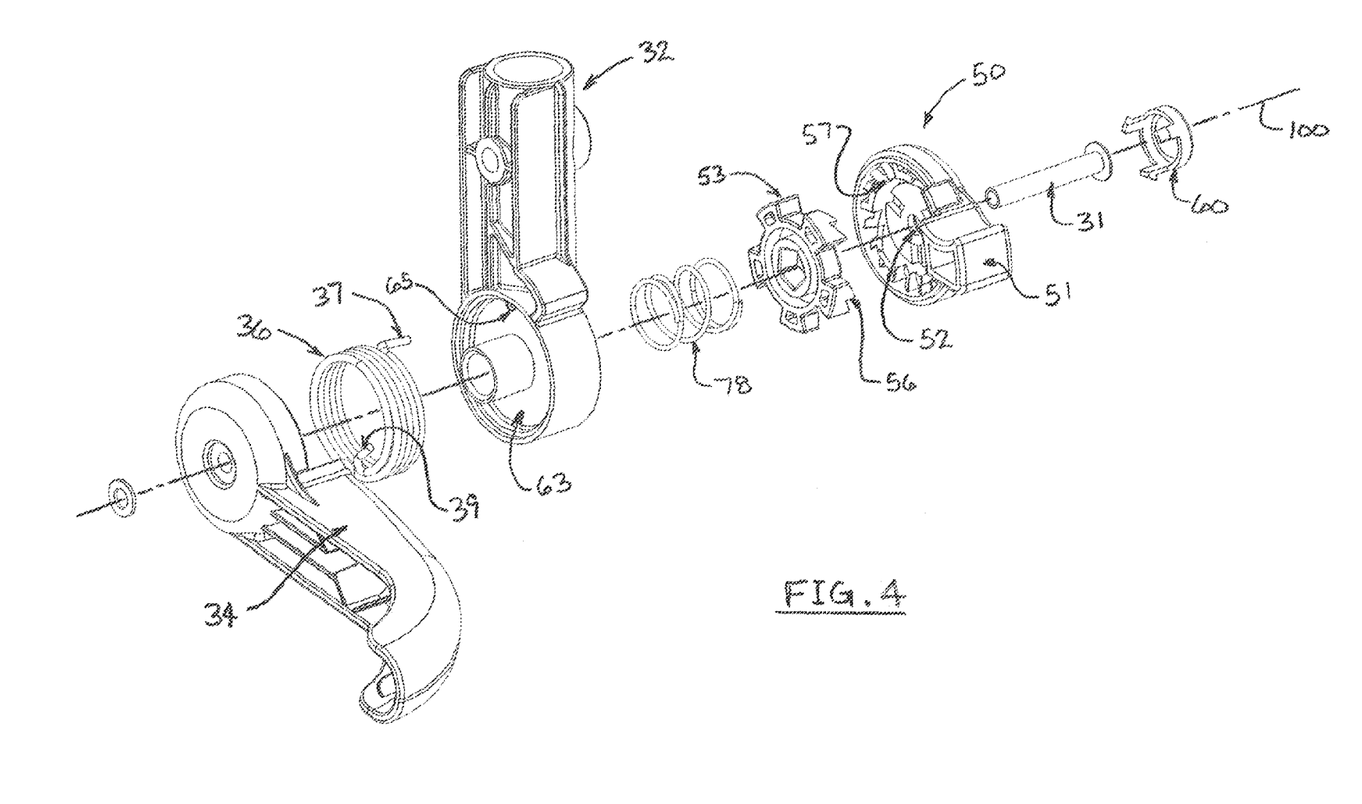
FIG. 4 is an exploded view from a second perspective of the calf support connector invention shown in FIG. 3.
Figure 5:
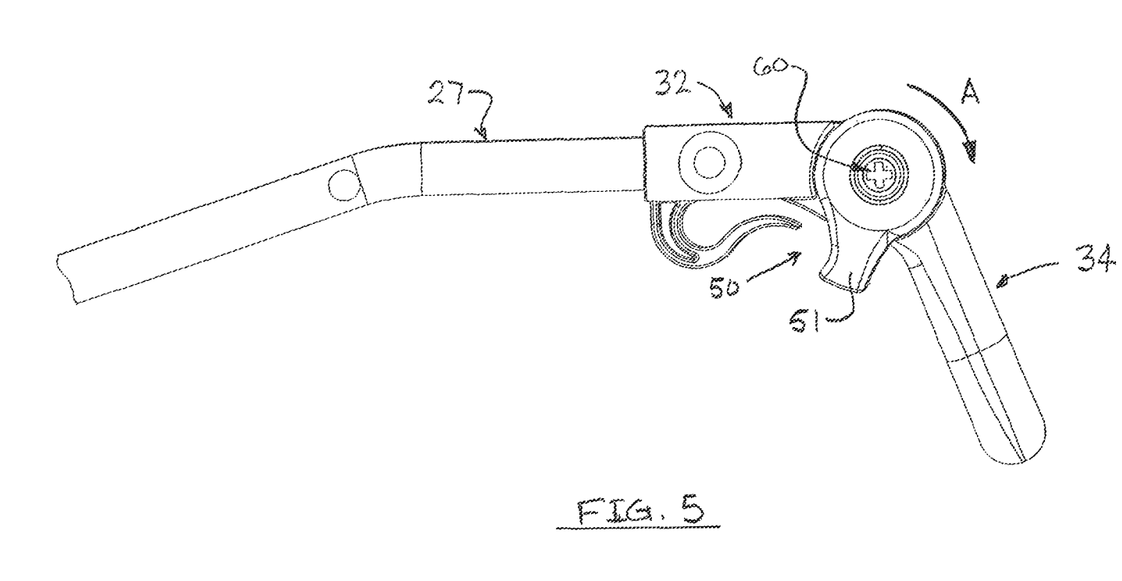
FIG. 5 is a side view of the calf support connector invention shown in a first position.
Figure 6:
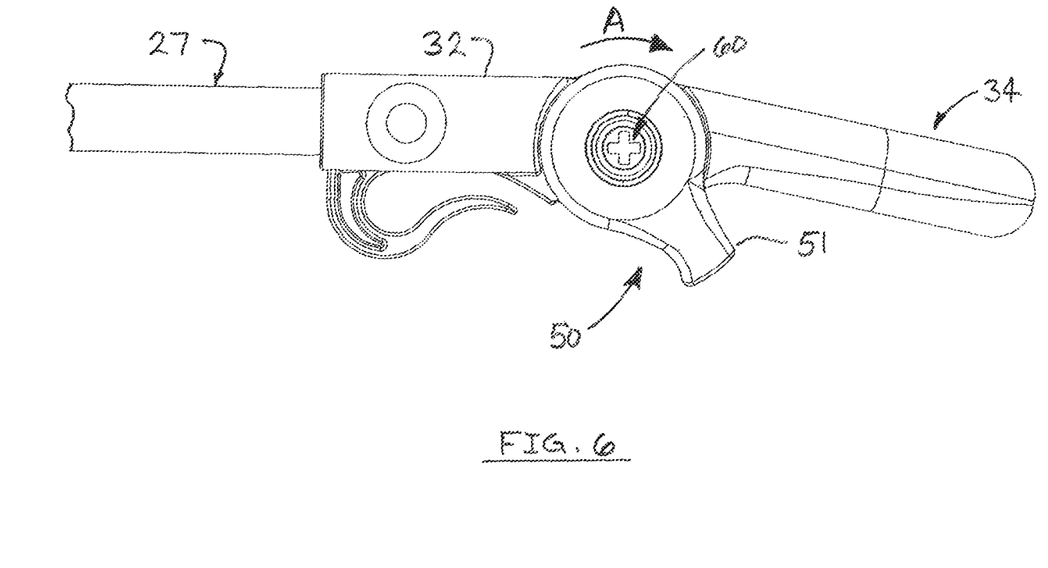
FIG. 6 is a side view of the calf support connector invention shown in a second position.

Alternatively, as is shown in FIGS. 3 and 4, a torque-resistant interface including a shaped hub 74 on the support mount 32 and mating aperture 76 in the lock gear 53 may also be used to rotationally fix the lock gear to the support mount. Lock gear 53 also includes a first set of ratchet teeth 56 configured to interact with a second set of ratchet teeth 57 on an interior surface of the travel limiter 50. The ratchet teeth 56, 57, when engaged, are configured to permit rotational movement in a direction opposite of the torsional spring 36 bias direction (refer to FIGS. 5 through 7) while substantially preventing rotation in the same direction of the torsional spring bias. Lock gear 53 is allowed to move axially along axis 100. A compression spring 78 disposed between the lock gear 53 and the support mount 32 biases the ratchet gear toward the travel limiter 50 to maintain the first and second sets of ratchet teeth 56, 57 in engagement. A release button 60 is provided to allow the lock gear 53 to be moved axially in a direction opposite of the compression spring 78 bias to disengage the ratchet teeth 56, 57 and allow the stop tab 51 to be rotated.

The above-described mechanism allows the travel limiter 50 to be rotated about axis 100 in a first direction from the first position (shown in FIG. 5) toward a second position (shown in FIG. 7) by the ratchet action. Rotation in a direction opposite of the first direction is prevented by the ratchet, thereby enabling the travel limiter 50 to be set in a desired position. The release button 60 releases the ratchet to allow selective movement in the second direction so that the travel limiter may be returned to the first position. The movement of stop tab 51 as shown progressively in FIGS. 5 through 7 (counterclockwise as viewed in the figures) is accomplished by sliding action of the ratchet teeth. Movement in the opposite direction (progressively from FIG. 7 to FIG. 5) is accomplished by releasing the ratchet teeth 56, 57 by depressing the release button 60 and rotating the travel limiter in a clockwise direction as viewed in the figures.

Figure 7:
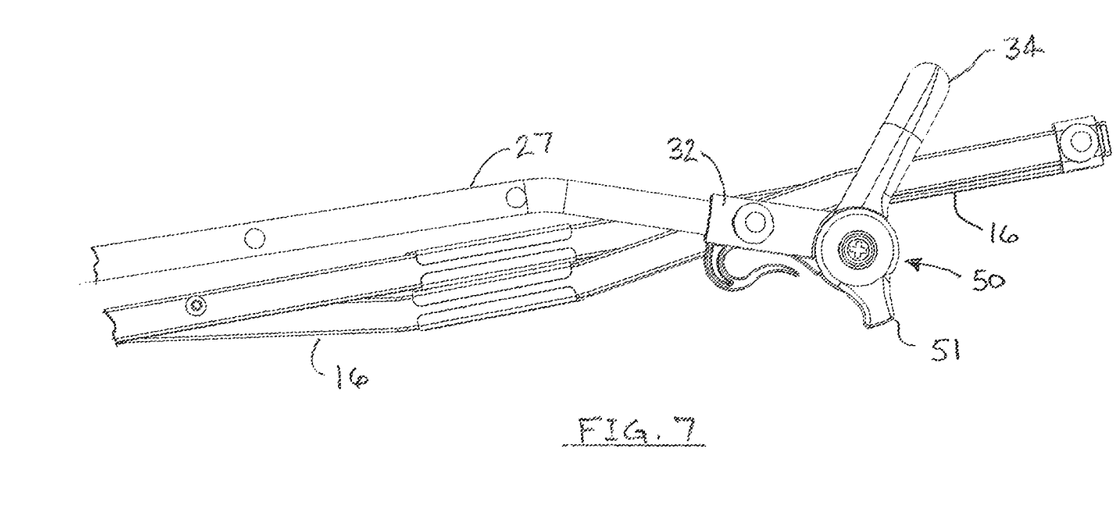
FIG. 7 is a side view of the calf support connector invention shown in a third position.
Figure 8:
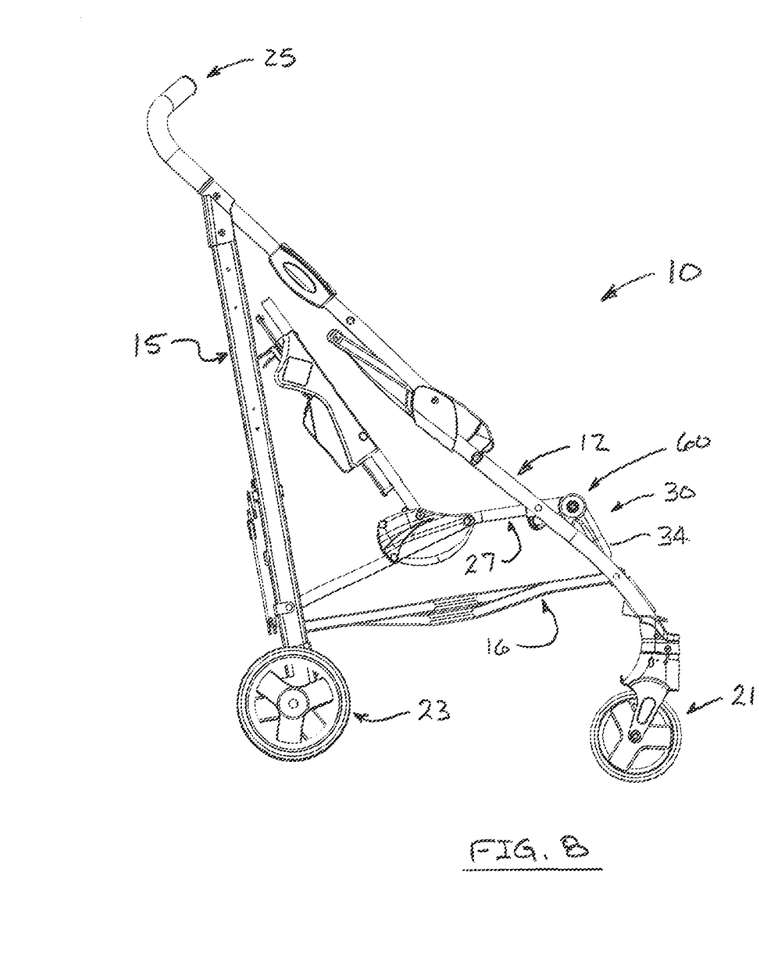
FIG. 8 is a side elevation view of a stroller having the moveable calf support as positioned in FIG. 5.
Figure 9:
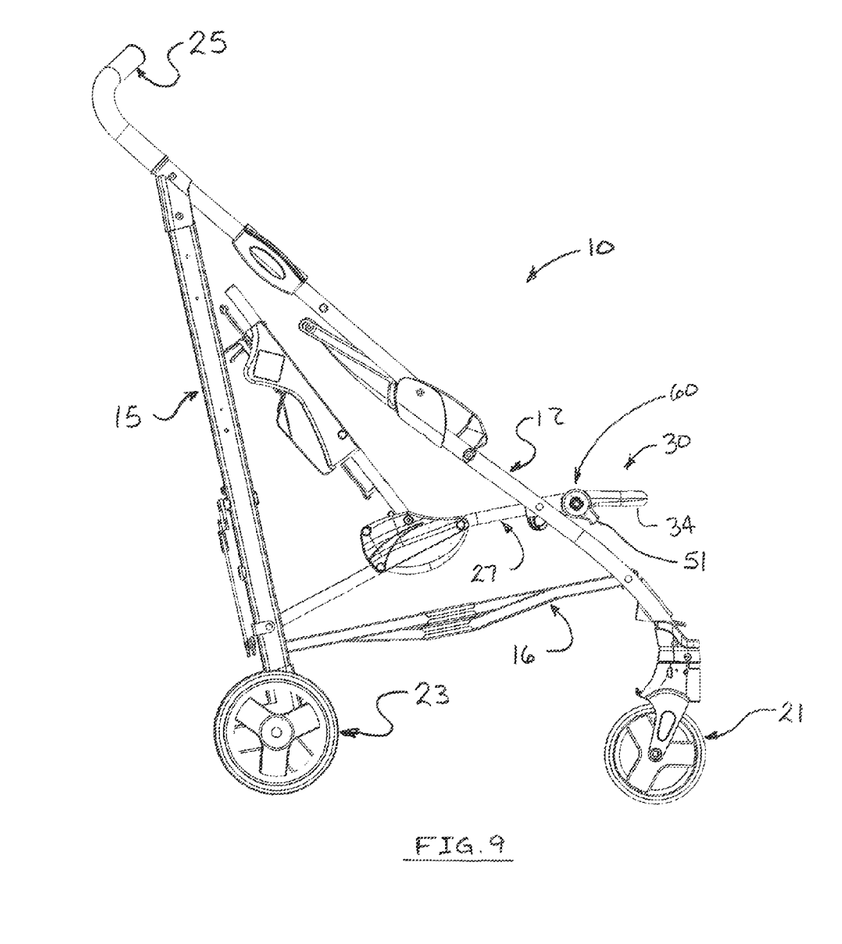
FIG. 9 is a side elevation view of a stroller having the moveable calf support as positioned in FIG. 6.
Figure 10:
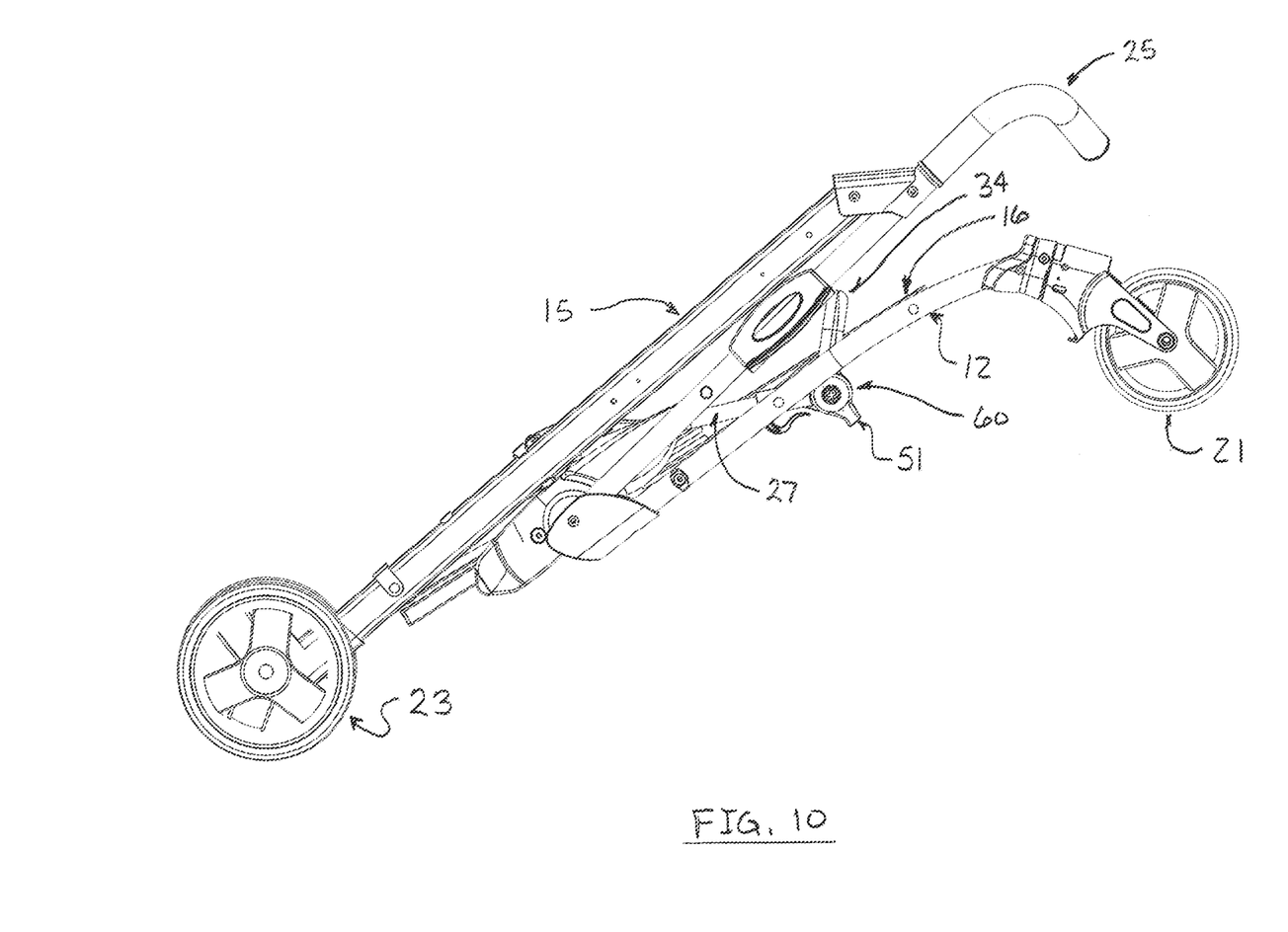
FIG. 10 is a side elevation view of a stroller having the moveable calf support as positioned in FIG. 7.

Folding action of the stroller 10 causes the calf support extension to be rotated toward a most upwardly vertical position shown in FIG. 7. As the stroller 10 is unfolded, the torsion spring 36 causes the support arm 34 to rotate until it contacts the stop tab 51 without any additional action by the user. Thus, the user may set the stop tab 51 to angularly orient the calf support extension into a desired position and the calf leg extension will return to that position each time the stroller is unfolded or deployed. The release button 60 and release capability of the lock gear 53 allows the travel limiter 50 to be easily readjusted to suit the user's needs at the time.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A leg support for a foldable stroller frame comprising:
    a moveable leg support portion;
    at least one support connector pivotally connecting the leg support portion to the stroller frame in a manner enabling pivotal movement of the leg support about a generally transverse axis between a first position and a second position;
    a biasing mechanism to bias the position of the leg support toward the first position; and
    a moveable stop configured for selective positioning in one of a plurality of stop positions, the moveable stop being external and adjacent to the at least one support connector and configured to contact the at least one support connector and limit leg support portion movement toward the first position while allowing leg support portion movement between the second position and the selected stop position resisted only by the biasing mechanism.

2. The leg support of claim 1, wherein the stroller frame is moveable between a collapsed configuration and a deployed configuration, movement of the stroller frame to the collapsed position results in movement of the leg support toward the second position, and movement of the stroller toward the deployed configuration allows the leg support to be moved by the biasing mechanism toward the first position to a leg support position corresponding to the selected stop position.

3. The leg support of claim 2, wherein the travel stop is moveable between opposing first and second stop positions.

4. The leg support of claim 3, wherein the travel stop further comprises a device which allows the stop mechanism to be selectively fixed in a desired position between the first stop position and the second stop position.

5. The leg support of claim 4, wherein the device is a ratchet with a selectively operable release.

6. A foldable stroller frame with a moveable leg support comprising:
    a frame having a forward end and being moveable between a collapsed configuration and a deployed configuration;
    a leg support connected by at least one leg support connector to the frame and radially extending from a generally transverse pivot axis and moveable between generally opposing first and second positions, the leg support biased toward the first position, the leg support being moved toward the second position by movement of the frame toward the collapsed configuration and toward the first position as the frame is moved toward the deployed configuration; and
    a travel stop connected to the frame and selectively positionable in one of a plurality of selected stop positions, the travel stop configured to interact with the exterior of the at least one leg support connector to limit leg support movement from the second position toward the first position to a position between the first and second positions corresponding to the selected stop position when the stroller is moved to the deployed configuration while permitting between the selected stop position and the second position.

7. The stroller frame of claim 6, wherein the travel stop is moveable between opposing first and second stop positions.

8. The stroller frame of claim 7, wherein the travel stop further comprises a mechanism which selectively inhibits movement of the travel stop from the second stop position to the first stop position allowing selectively positioning of the travel stop therebetween.

9. The stroller frame of claim 8, wherein the mechanism is a ratchet with a selectively operable release.

10. A folding stroller frame with a moveable leg support comprising:
    at least one leg support connector connecting a leg support to the frame enabling pivotal movement about a generally transverse axis between generally opposing first and second positions, the leg support being spring biased toward the first position, folding of the stroller frame pivoting the leg support toward the second position; and
    a travel stop connected to the frame in a manner to externally interact with the at least one leg support connector to limit movement of the leg support toward the first position to one of a plurality of pre-selected stop positions intermediate to the first and second leg support positions so that the leg support returns from the second position to the pre-selected stop position by action of the spring bias when the stroller frame is unfolded.

11. The stroller frame of claim 10, wherein the travel stop is moveable between opposing first and second limit positions.

12. The stroller frame of claim 11, wherein the first and second limit positions permit movement of the leg support between the first and second positions.

13. The stroller frame of claim 12, wherein the travel stop further comprises a mechanism which selectively inhibits movement of the travel stop from the second stop position to the first stop position.

14. The stroller frame of claim 13, wherein the mechanism is a ratchet with a selectively operable release.

* * * * *